UNITED STATES PATENT OFFICE 2,290,462

DIHALOGENATED ETHERS

Charles F. H. Allen and James Van Allan, Rochester, N. Y., assignors to Eastman Kodak Company, Rochester, N. Y., a corporation of New Jersey No Drawing. Application January 6, 1940,
Serial No. 312,722

6 Claims. (Cl. 260—615)

This invention relates to di-halogenated ethers and their method of preparation, and more particularly to di-halogenated methyl ethers of polyhydric alcohols.

A number of halogenated ethers and particularly the mono-halogenated ethers are known and used industrially for various purposes. As an example, the mono-halogenated ether (lauryl-$\alpha$-chloroethyl ether) may be mentioned. Also a few di-halogenated ethers have been described. However, these have generally comprised the chloroethyl derivatives.

We have found that new halogenated ethers may be prepared by a relatively simple procedure, with excellent yields. Our new halogenated ethers may be employed for a number of purposes in the prior art wherein the aforementioned ethers have been employed, and in particular our novel ethers possess a high degree of utility because of the especially active nature of the halogen atom therein.

This invention has for one object to provide new di-halogenated ethers of di-hydroxy aliphatic compounds. Another object is to provide novel halogenated ethers containing a halogen atom possessing substantial activity. Still another object is to provide novel halogenated ethers of glycols containing six or more carbon atoms. Still another object is to provide novel halogenated ether derivatives of glycols and containing at least one chloromethyl group. A still further object is to provide a simple and efficient method for the preparation of the afore-described compounds. Other objects will appear hereinafter.

We have found that halogenated alkyl ethers and preferably the chloromethyl derivatives of di-hydroxy alcohols may be prepared and that these compounds exhibit excellent activity with respect to the halogen atoms. We have found that the activity of the halogen atoms in our preferred compound wherein the halogen atom is attached to the methyl group, possesses considerably greater activity than, for example, when attached to other groups as an ethyl group. We have found that our novel compounds may be easily prepared with excellent yields by reacting the di-hydroxy compound with formaldehyde, a solvent and dry hydrogen chloride, as will be set forth in detail hereinafter.

For a more detailed understanding of our invention, reference is made to the following examples, which are set forth for the purposes of illustrating certain preferred embodiments.

EXAMPLE 1.—*Hexamethylene-bis-oxymethyl cloride* $(ClCH_2O(CH_2)_6OCH_2Cl)$

A mixture of 3.9 parts of hexamethylene glycol, 2.1 parts of trioxymethylene, and 15 parts of benzene is cooled to 15° C., and hydrogen chloride passed in for 2 hours. The water layer is separated and the benzene removed on a steam bath under vacuum, leaving 4.2 parts of chloride.

EXAMPLE 2.—*Decamethylene-bis-oxymethyl chloride* $(ClCH_2O(CH_2)_{10}OCH_2Cl)$

A mixture of 100 parts of decamethylene glycol, 35 parts of trioxymethylene, and 1000 parts of benzene is cooled to 5–10° C., and while stirring, dry hydrogen chloride is passed in until all the solid in suspension has gone into solution. This takes 3.5 to 4 hours. The separated aqueous layer is removed, the benzene removed in vacuo, and the residue used directly or distilled in vacuo. The yield of distilled product is 115 parts, B. P. 200–203°/15 mm.

EXAMPLE 3.—*Trimethylene-bis-oxymethyl chloride* $(ClCH_2O(CH_2)_3OCH_2Cl)$

A mixture of 7.6 parts of trimethylene glycol, 5 parts of trioxymethylene, and 25 parts of benzene is cooled to 15° C., and hydrogen chloride passed in for 2 hours. The water layer is separated and the benezene removed on a steam bath under vacuum, leaving 9.8 parts of chloride.

EXAMPLE 4.—*Ethylene-bis-oxymethyl chloride*

$(ClCH_2OCH_2CH_2OCH_2Cl)$

A mixture of 310 parts of ethylene glycol, 300 parts of trioxymethylene, and 1000 parts of benzene is externally cooled to 10–15° C., and dry hydrogen chloride is passed into the mixture until it is saturated. This takes about 5 hours. The water formed during the reaction and any unused glycol form a layer which is separated. The solvent is removed from the residual solution on a steam bath in vacuo. The clear residual liquid (412 parts) is used directly.

In a similar manner, other compounds such as, for example, $\beta$-n-amyloxyethoxymethyl chloride $(C_5H_{11}OC_2H_4OCH_2Cl)$, B. P. 108–111°/23 mm., prepared from glycol-mono-n-amylether, may be prepared.

As already indicated, our novel compounds may be employed for various purposes, wherein, for example, the prior art halogenated compounds have heretofore been employed. In particular, however, our novel halogenated ethers are useful, wherein an active halogen atom is desired.

For example, they form alkoxynitriles, and salts with amines, sulfides, phosphines, etc. The substances so formed may be surface-active, e. g. foaming and wetting agents.

The benzene used as a solvent may be replaced by ether, dioxane, or chloroform, and the like.

From the foregoing, it is apparent that our invention is susceptible of some modification and hence, we do not wish to be restricted, excepting insofar as may be necessitated by the prior art and the spirit of the appended claims.

What we claim and desire to be secured by Letters Patent of the United States is:

1. Compounds having the formula:

$$ClCH_2O(CH_2)_nOCH_2Cl$$

wherein $n$ is at least 5.

2. A process for the manufacture of halogenated ethers, which comprises reacting a mixture of a polyhydric alcohol, paraformaldehyde and dry halogen chloride, said reaction being carried out in the presence of a non-aqueous solvent for said mixture, and for a period of from one to eight hours.

3. The compound hexamethylene-bis-oxymethyl chloride.

4. The compound decamethylene-bis-oxymethyl chloride.

5. A process for the manufacture of dichloromethyl ethers of polyhydric alcohols, which comprises reacting together a mixture of the polyhydric alcohol, para-formaldehyde and dry hydrogen chloride for 1–8 hours in the presence of a solvent from the group consisting of benzene, dioxane, ether, and chloroform and separating water from the reaction mixture to obtain the chloromethyl ether.

6. A process for the manufacture of dichloromethyl ethers of polyhydric alcohols, which comprises reacting together a mixture of the polyhydric alcohol, para-formaldehyde and hydrogen chloride in the presence of a solvent from the group consisting of benzene, dioxane, ether, and chloroform, and separating water from the reaction mixture to obtain the chloromethyl ether.

CHARLES F. H. ALLEN.
JAMES VAN ALLAN.